Patented Apr. 24, 1945

2,374,525

UNITED STATES PATENT OFFICE 2,374,525

MORPHOLINE SUBSTITUTED ESTERS

Lee C. Cheney, Detroit, and William G. Bywater, Grosse Pointe Woods, Mich., assignors to Parke, Davis & Company, Detroit, Mich., a corporation of Michigan No Drawing. Original application July 5, 1940, Serial No. 344,136. Divided and this application December 13, 1943, Serial No. 514,162

5 Claims. (Cl. 260—247)

The invention relates to the preparation of certain new morpholine substituted esters.

This application is a division of our copending application, Serial No. 344,136, filed July 5, 1940, in which we have disclosed and claimed a broad class of aliphatic acid esters of morpholine substituted alcohols.

The present application is directed to the preparation of δ-(4-morpholino)-n-hexyl diphenyl acetate and its acid addition salts such as the hydrochloride. These compounds have been found to have outstanding therapeutic properties.

The new compounds have the following formula for the free base:

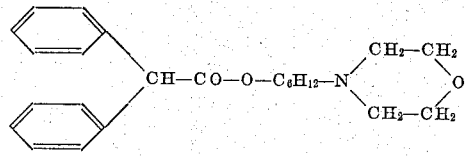

The new compounds may be prepared as follows:

A mixture of 26.5 grams (0.109 mole) of hexamethylene bromide, 27.5 grams (0.11 mole) of pulverized potassium diphenyl acetate and 100 ml. of sodium-dried xylene is efficiently stirred and refluxed in a wax bath maintained at 170–180° for 5 or 6 hours.

The mixture is cooled and 19.2 grams (0.22 mole) of morpholine are introduced. The stirred mixture is refluxed at 155–165° for about 2¼ hours, cooled and decanted. The residue is extracted with 100 ml. of boiling xylene. The combined xylene solutions are filtered and the cold xylene solution extracted with dilute hydrochloric acid. The acid extract is cooled in ice, extracted twice with ether and then rendered basic with saturated sodium carbonate solution. The liberated base is taken up in ether and the ether solution is washed 3 times with cold water to remove all morpholine. The solution can be rapidly dried by mechanically shaking it over anhydrous potassium carbonate for 1½ hours. The hydrochloride is precipitated as an oil by the addition of an excess of 4.88 molar absolute alcoholic hydrochloric acid. Crystallization can be induced by cooling the oil in an ice-salt bath and rubbing the oil against the container with a glass rod. The crystals are filtered off and dried to yield about 15 grams of crude hydrochloride of melting point 104–107° C. Two crystallizations from anhydrous isopropanol and then two from ethyl acetate give white micro crystals of melting point 113–114° C. (corr.) of pure δ-(4-morpholino)-n-hexyl diphenyl acetate hydrochloride. The reactions involved in this example may be indicated by the following diagram:

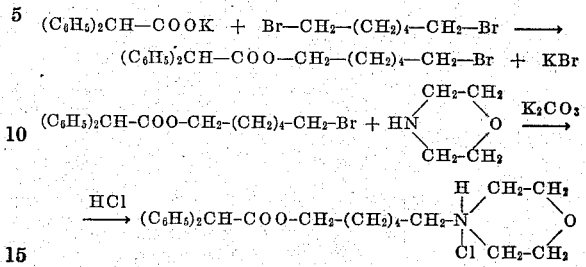

The invention includes the free amine of the above hydrochloride salt and also salts of the free amine with acids HX where X is an anion of an organic or inorganic acid. The preferred salts are those of non-oxidizing, non-toxic organic or inorganic acids which are water-soluble.

For example, the hydrobromide may be prepared by using the ether solution of the free base, prepared as above, prior to the treatment with alcoholic hydrochloric acid, and passing gaseous hydrogen bromide, generated from bromine and boiling tetralin, directly into the ether solution, or by treating the ether solution with 48% aqueous hydrobromic acid. In the latter case the mixture is evaporated to dryness under reduced pressure, the product is taken up in boiling absolute alcohol and then allowed to crystallize.

The sulfate is prepared by removing the ether from the solution of the morpholine ester, and treating the oily ester with an equivalent of 5N sulfuric acid, then evaporating the solution to dryness. The resulting glassy solid is recrystallized from absolute alcohol.

The picrate is prepared by dissolving the free base in absolute alcohol, adding an alcoholic solution of 85% picric acid, then boiling the resulting solution for two minutes. The picrate separates upon cooling and may be recrystallized from absolute alcohol.

What we claim as our invention is:

1. A compound of the group consisting of an ester of the formula

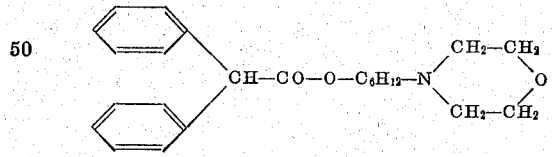

and the acid addition salts of said ester.

2. A compound having the formula
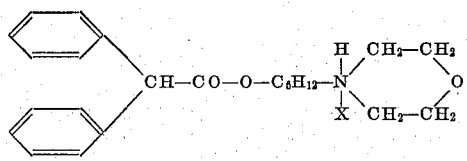
where X represents an anion of a non-oxidizing non-toxic water-solubilizing acid.
3. A compound having the formula
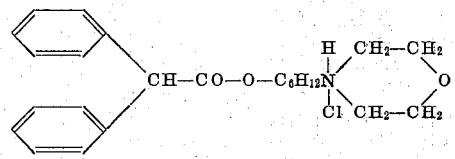
4. A compound having the formula
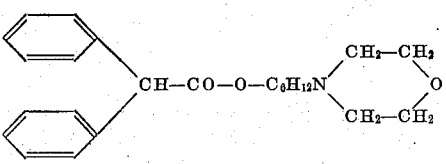
5. Δ-(4-morpholino)-n-hexyl diphenyl acetate hydrochloride.
LEE C. CHENEY.
WILLIAM G. BYWATER.